R. H. PEARMAN.
CAMERA.
APPLICATION FILED JULY 31, 1919.
1,353,266.
Patented Sept. 21, 1920.
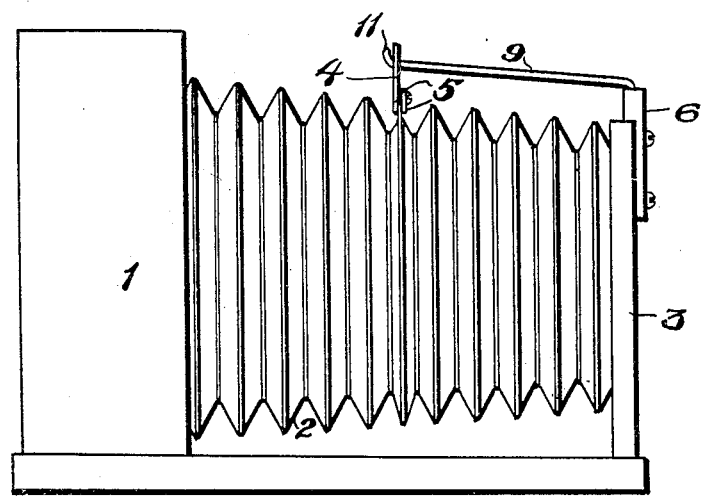
Fig. 1.
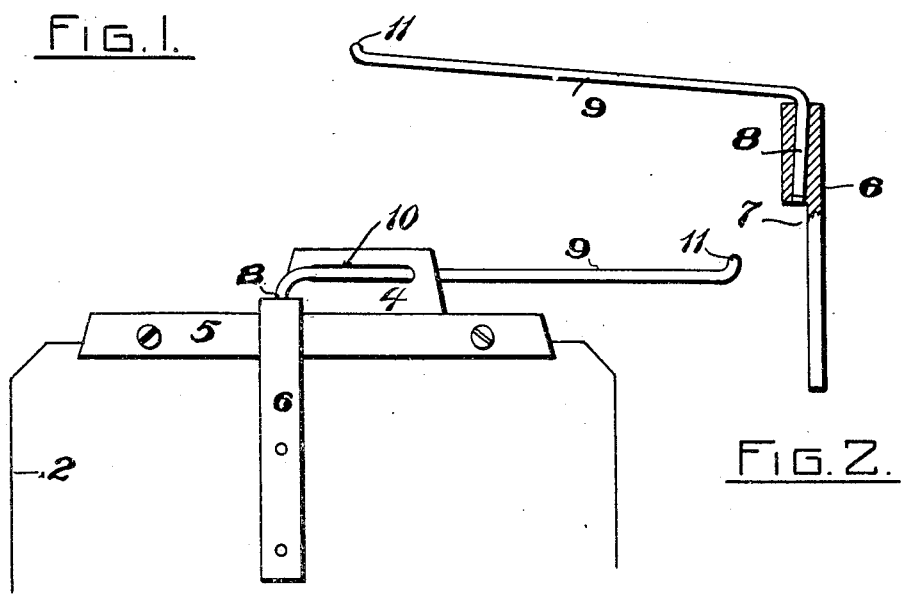
Fig. 2.
Fig. 3.
INVENTOR.
Robert H. Pearman
Joseph A. Miller
ATTORNEY

UNITED STATES PATENT OFFICE.

ROBERT H. PEARMAN, OF BOSTON, MASSACHUSETTS, ASSIGNOR TO THOMAS E. STEERE, OF PROVIDENCE, RHODE ISLAND.

CAMERA.

1,353,266.  Specification of Letters Patent.  Patented Sept. 21, 1920.

Application filed July 31, 1919. Serial No. 314,496.

*To all whom it may concern:*

Be it known that I, ROBERT H. PEARMAN, a citizen of the United States, residing at Boston, in the county of Suffolk and State of Massachusetts, have invented new and useful Improvements in Cameras, of which the following is a specification.

This invention relates to certain new and useful improvements in a camera with particular reference to the bellows type, and it has for its primary object to provide means to prevent the extended bellows from sagging intermediate of its end supports.

The invention further resides in a folding support for the central portion of the bellows to fold and unfold therewith whereby the device may be a permanent fixture on the camera.

Further, the invention resides in the features of construction and the arrangements and combinations of parts hereinafter described and claimed, reference being had to the accompanying drawing wherein, Figure 1 is a side elevation of a camera equipped with the present invention in its operative position:

Fig. 2 is a side view partly in section of the supporting arm and its mounting; and Fig. 3 is a front elevation of the device in its folded or inoperative position the front board 3 being omitted.

The camera 1 embodies the bellows 2 and the front board or lens holder 3. In the folding type of camera it has been found that the bellows sags in the middle and more especially is this true where the bellows extends a considerable distance.

The present invention, designed to overcome this sagging of the bellows between its end supports, comprises an eye member 4 clamped to one of the central folds of the bellows by a pair of plates or jaws 5, with one of which the eye member is formed integral or otherwise secured. An upright bracket or support 6 is secured to the front board 1, said bracket having a side portion cut away to fit and engage over the upper edge of the front board, as indicated at 7, and in the upper end of this bracket is an upright bore slightly tilted forwardly and constituting a bearing to receive the downturned terminal 8, of the bellows supporting arm 9. This arm is threaded, through the eye opening, which is in the form of a horizontal slot 10, and has its free end turned up into a lip 11 serving as a limitation stop to prevent undue extension of the bellows.

In practice, the free end of the more or less resilient arm exerts a lifting force in sustaining the weight of the bellows substantially midway between its ends. As the bellows is contracted or closed the supporting arm slides through the eye and may be folded laterally for proper nesting in the camera box, and as the bellows is extended or opened the arm unfolds by swinging rearwardly in which connection it will be noted that the arm also swings upwardly by reason of the tilted bearing in the bracket 6. This action tends to lift on the bellows increasingly during the extending movements. The support thus acts efficiently and is of simple design, being applicable to the cameras now in daily use without any modification thereof whatever.

Having thus described my invention, which I claim as new and desire to secure by Letters Patent is:—

1. An attachment for a bellows camera, comprising an eye member adapted to be secured to the central portion of the camera bellows, a bracket adapted to be secured to the front board and formed with an upright, forwardly tilted bearing, and a supporting arm slidable through the eye member and having its forward end downturned and engaged in the bearing of the bracket.

2. In combination with a camera having a bellows and a front board, means extending longitudinally above the bellows for supporting the central folds of the bellows from the top of the latter and means for supporting said first means from the front board having a part angularly disposed to effect upward movement of the first means upon outward movement of the front board.

3. In combination with a camera having a bellows and a front board, laterally foldable means carried by the front board for supporting the bellows intermediate its ends by suspension.

4. In combination with a camera having a bellows and a front board, means for supporting the central portion of the bellows from the top thereof comprising a laterally foldable overhead structure, and means to mount said means on the front board.

5. In combination with a camera having a bellows and a front board, a rod overlying the bellows and connected at its inner end thereto, and means to mount the outer end of the rod on the front board having a part angularly disposed to effect upward movement of the inner end of the rod upon outward movement of the front board.

6. In combination with a camera having a bellows and a front board, foldable means overlying the bellows connected thereto to support same, and means having a part angularly disposed whereby upon distending of the bellows said foldable means will be moved upwardly at its point of connection with the bellows.

7. In combination with a camera having a bellows and a front board, an arm pivoted at one end to the front board and foldable laterally thereof, said arm overlying the bellows and means to connect the opposite end of the arm to the bellows.

In testimony whereof I have signed my name to this specification in the presence of two subscribing witnesses.

ROBERT H. PEARMAN

Witnesses:
WORTHINGTON C. FORD,
WARREN G. WHEELER.